(12) United States Patent
Mahimkar et al.

(10) Patent No.: US 12,556,451 B2
(45) Date of Patent: Feb. 17, 2026

(54) APPARATUSES AND METHODS FOR ENHANCING QUALITY OF SERVICE VIA AN EXPLORATION OF CONFIGURATION OPTIONS

(71) Applicants: AT&T Intellectual Property I, L.P., Atlanta, GA (US); AT&T Mobility II LLC, Atlanta, GA (US)

(72) Inventors: Ajay Mahimkar, Edison, NJ (US); Changhan Ge, Austin, TX (US); Zihui Ge, Madison, NJ (US); Shomik Pathak, Richardson, TX (US); Maulik Shah, Carrollton, TX (US); Karunasish Biswas, Sammamish, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 82 days.

(21) Appl. No.: 18/680,298

(22) Filed: May 31, 2024

(65) Prior Publication Data
US 2025/0373493 A1    Dec. 4, 2025

(51) Int. Cl.
*G06F 15/177* (2006.01)
*H04L 41/0893* (2022.01)
*H04L 41/5019* (2022.01)

(52) U.S. Cl.
CPC ...... *H04L 41/0893* (2013.01); *H04L 41/5019* (2013.01)

(58) Field of Classification Search
CPC .............. H04L 41/0893; H04L 41/5019
See application file for complete search history.

(56) References Cited

U.S. PATENT DOCUMENTS

| 11,212,710 B1 | 12/2021 | Mahimkar et al. |
| 2022/0159515 A1 | 5/2022 | Mahimkar et al. |

OTHER PUBLICATIONS

"3GPP TS 32.541 V10.0.0 (2011-03)", 3rd Generation Partnership Project; Technical Specification Group Services and System Aspects; Telecommunication management; Self-Organizing Networks (SON); Self-healing concepts and requirements (Release 10).

"ETSI TS 121 101 V8.0.0 (Mar. 2009)", Universal Mobile Telecommunications System (UMTS); Technical Specifications and Technical Reports for a UTRAN=based 3GPP system (3GPP TS 21.101 version 8.0.0 Release 8).

(Continued)

*Primary Examiner* — Joseph R Maniwang
(74) *Attorney, Agent, or Firm* — Guntin & Gust, PLC; Mark Wilinski

(57) ABSTRACT

Aspects of the subject disclosure may include, for example, establishing a first cluster comprising a first plurality of members, identifying a first plurality of values to trial in respect of a first member of the first plurality of members, the first plurality of values being included in a second plurality of values and being less than an entirety of the second plurality of values, performing a first plurality of trials in respect of the first member of the first plurality of members based on iterating amongst the first plurality of values to obtain a first plurality of results, selecting at least one value included in the first plurality of values based on the first plurality of results, and utilizing the at least one value for each member of the first plurality of members of the first cluster. Other embodiments are disclosed.

20 Claims, 8 Drawing Sheets

(56) References Cited

OTHER PUBLICATIONS

"ETSI TS 132 500 V17.0.0", Universal Mobile Telecommunications System (UMTS); LTE; Telecommunication management; Self-Organizing Networks (SON); Concepts and requirements (3GPP TS 32.500 version 17.0.0 Release 17), 2022, 15 pages.

"ETSI TS 136 213 V9.2.0 (Jun. 2010)", LTE; Evolved Universal Terrestrial Radio Access (E-UTRA); Physical layer procedures (3GPP TS 36.213 version 9.2.0 Release 9).

"Self-Optimizing Networks: The Benefits of SON in LTE", 2011, 69 pages.

"Wasserstein metric", Wikipedia, https://en.wikipedia.org/wiki/Wasserstein_metric, Downloaded Sep. 19, 2023, 12 pages.

Abhashkumar, Anubhavnidhi et al., "AED: Incrementally Synthesizing Policy-Compliant and Manageable Configurations", in Proceedings of the 16th International Conference on Emerging Networking Experiments and Technologies. Association for Computing Machinery, New York, NY, USA, https://doi.org/10.1145/3386367.3431304, Dec. 1-4, 2020, 14 pages.

Alipourfard, Omid et al., "CherryPick: Adaptively Unearthing the Best Cloud Configurations for Big Data Analytics", in 14th USENIX Symposium on Networked Systems Design and Implementation (NSDI 17). USENIX Association, Boston, MA, https://www.usenix.org/conference/nsdi17/technicalsessions/presentation/alipourfard, 2017, 15 pages.

Barth, U. , "Self-X RAN: Autonomous Self Organizing Radio Access Networks", Abstract; in IEEE WiOpt, 2009, 2 pages.

Beckett, Ryan et al., "A General Approach to Network Configuration Verification", in Proceedings of the Conference of the ACM Special Interest Group on Data Communication (Los Angeles, CA, USA) (SIGCOMM '17). Association for Computing Machinery, New York, NY, USA, https://doi.org/10.1145/3098822.3098834, Aug. 21-25, 2017, 14 pages.

Beckett, Ryan et al., "Don't Mind the Gap: Bridging Network-Wide Objectives and Device-Level Configurations", in Proceedings of the 2016 ACM SIGCOMM Conference (Florianopolis, Brazil) (SIGCOMM '16). Association for Computing Machinery, New York, NY, USA, 10.1145/3371934.3371965, Nov. 8, 2019, 4 pages.

Beckett, Ryan et al., "Network Configuration Synthesis with Abstract Topologies", in Proceedings of the 38th ACM SIGPLAN Conference on Programming Language Design and Implementation (Barcelona, Spain) (PLDI 2017). Association for Computing Machinery, New York, NY, USA, https://doi.org/10.1145/3062341.3062367, 2017, 15 pages.

Birkner, Rüdiger et al., "Config2Spec: Mining Network Specifications from Network Configurations", in 17th USENIX Symposium on Networked Systems Design and Implementation (NSDI 20). USENIX Association, Santa Clara, CA., 2020, 16 pages.

Borst, Simon C. et al., "Dynamic Optimization in Future Cellular Networks", Bell Labs Technical Journal 10, 2, http://dblp.uni-trier.de/db/journals/bell/bell10.html#BorstBDFGHHMPRSWW05, 2005, 21 pages.

Cao, Zhen et al., "Carver: Finding Important Parameters for Storage System Tuning", in Proceedings of the 18th USENIX Conference on File and Storage Technologies (Santa Clara, CA, USA) (FAST'20). USENIX Association, USA, 2020, 15 pages.

Cohen, William W. , "Fast effective rule induction", in Machine learning proceedings; Elsevier, 1995, 10 pages.

El-Hassany, Ahmed et al., "Netcomplete: Practical Network-Wide Configuration Synthesis with Autocompletion", in Proceedings of the 15th USENIX Conference on Networked Systems Design and Implementation (Renton, WA, USA) (NSDI'18). Usenix Association, USA, 2018, 17 pages.

Fayaz, Seyed K. et al., "Efficient Network Reachability Analysis Using a Succinct Control Plane Representation", in Proceedings of the 12th USENIX Conference on Operating Systems Design and Implementation (Savannah, GA, USA) (OSDI'16). USENIX Association, USA, Nov. 2-4, 2016, 17 pages.

Fogel, Ari et al., "A General Approach to Network Configuration Analysis", in Proceedings of the 12th USENIX Conference on Networked Systems Design and Implementation (Oakland, CA) (NSDI'15). USENIX Association, USA, 2015, 16 pages.

Ge, Changhan et al., "Chroma: Learning and Using Network Contexts to Reinforce Performance Improving Configurations", in Proceedings of the 29th Annual International Conference on Mobile Computing and Networking. Association for Computing Machinery, New York, NY, USA, Article 42, https://doi.org/10.1145/3570361.3613256, 2023, 16 pages.

Gember-Jacobson, Aaron et al., "Automatically Repairing Network Control Planes Using an Abstract Representation", in Proceedings of the 26th Symposium on Operating Systems Principles (Shanghai, China) (SOSP '17). Association for Computing Machinery, New York, NY, USA, https://doi.org/10.1145/3132747.3132753, 2017, 15 pages.

Gember-Jacobson, Aaron et al., "Fast Control Plane Analysis Using an Abstract Representation", in Proceedings of the 2016 ACM SIGCOMM Conference (Florianopolis, Brazil) (SIGCOMM '16), Association for Computing Machinery, New York, NY, USA, https://doi.org/10.1145/2934872.2934876, 2016, 14 pages.

Govindan, Ramesh et al., "Evolve or Die: High-Availability Design Principles Drawn from Googles Network Infrastructure", in Proceedings of the 2016 ACM SIGCOMM Conference (Florianopolis, Brazil) (SIGCOMM '16). ACM, New York, NY, USA, https://doi.org/10.1145/2934872.2934891, 2016, 15 pages.

Hamalainen, S. , "LTE Self-Organising Networks (SON): Network Management Automation for Operational Efficiency", Wiley, 1st edition; Description of Book, 2012, 3 pages.

He, Haochen et al., "Multi-Intention-Aware Configuration Selection for Performance Tuning", in Proceedings of the 44th International Conference on Software Engineering (Pittsburgh, Pennsylvania) (ICSE '22). Association for Computing Machinery, New York, NY, USA, https://doi.org/10.1145/3510003.3510094, 2022, 12 pages.

Hu, Yigong et al., "Automated Reasoning and Detection of Specious Configuration in Large Systems with Symbolic Execution", in 14th USENIX Symposium on Operating Systems Design and Implementation (OSDI 20). USENIX Association, https://www.usenix.org/conference/osdi20/presentation/hu, Nov. 4-6, 2020, 17 pages.

Kakarla, Siva Kesava R. et al., "Finding Network Misconfigurations by Automatic Template Inference", in 17th USENIX Symposium on Networked Systems Design and Implementation (NSDI 20). USENIX Association, Santa Clara, CA, https://www.usenix.org/conference/nsdi20/presentation/kakarla, Feb. 25-27, 2020, 17 pages.

Kakarla, Siva Kesava R. et al., "GRoot: Proactive Verification of DNS Configurations", in SIGCOMM 2020, https://www.microsoft.com/en-us/research/publication/groot-proactive-verification-of-dns-configurations/, 2020, 19 pages.

Kanellis, Konstantinos et al., "Too Many Knobs to Tune? Towards Faster Database Tuning by Pre-Selecting Important Knobs", in Proceedings of the 12th USENIX Conference on Hot Topics in Storage and File Systems (HotStorage'20). USENIX Association, USA, Article 16, 2020, 8 pages.

Karthikeyan, Ajaykrishna et al., "SelfTune: Tuning Cluster Managers", in 20th USENIX Symposium on Networked Systems Design and Implementation (NSDI 23). USENIX Association, Boston, MA, https://www.usenix.org/conference/nsdi23/presentation/karthikeyan, Apr. 17-19, 2023, 19 pages.

Kazemian, Peyman et al., "Header Space Analysis: Static Checking for Networks", in Proceedings of the 9th USENIX Conference on Networked Systems Design and Implementation (San Jose, CA) (NSDI'12). Usenix Association, USA, 2012, 14 pages.

Le, Franck et al., "Minerals: Using Data Mining to Detect Router", May 23, 2006, 14 pages.

Li, Zhao L. et al., "Metis: Robustly Tuning Tail Latencies of Cloud Systems", in 2018 USENIX Annual Technical Conference (USENIX ATC 18). USENIX Association, Boston, MA, https://www.usenix.org/conference/atc18/presentation/li-zhao, Jul. 11-13, 2018, 13 pages.

Liu, Hongqiang H. et al., "Automatic Life Cycle Management of Network Configurations", in Proceedings of the Afternoon Workshop on Self-Driving Networks (Budapest, Hungary) (SelfDN 2018).

(56) References Cited

OTHER PUBLICATIONS

Association for Computing Machinery, New York, NY, USA, https://doi.org/10.1145/3229584.3229585, 2018, 7 pages.
Mahimkar, Ajay et al., "Auric: Using Data-Driven Recommendation to Automatically Generate Cellular Configuration", in Proceedings of the 2021 ACM SIGCOMM 2021 Conference (Virtual Event, USA) (SIGCOMM '21). Association for Computing Machinery, New York, NY, USA, https://doi.org/10.1145/3452296.3472906, 2021, 14 pages.
Mahimkar, Ajay et al., "Aurora: Conformity-based Configuration Recommendation to Improve LTE/5G Service", IMC '22, Nice, France, Oct. 25-27, 2022, 15 pages.
Mahimkar, Ajay et al., "Aurora: conformity-based configuration recommendation to improve LTE/5G service", Abstract; in Proceedings of the 22nd ACM Internet Measurement Conference, IMC 2022, Nice, France, https://doi.org/10.1145/3517745.3561455, Oct. 25-27, 2022, 5 pages.
Mahimkar, Ajay et al., "Detecting the Performance Impact of Upgrades in Large Operational Networks", in ACM SIGCOMM, 2010, 12 pages.
Mahimkar, Ajay et al., "Optimization of Long Term Evolution/Fifth Generation Service Through Conformity-Based Recommendations", U.S. Appl. No. 17/814,100, filed Jul. 21, 2022, Jul. 21, 2022, 36 pages.
Mahimkar, Ajay et al., "Performance-Driven Network Parameter Changes in a Communication Network", AppIn No. U.S. Appl. No. 18/090,784, filed Dec. 29, 2022, Dec. 29, 2022, 56 pages.
Mahimkar, Ajay et al., "Rapid detection of maintenance induced changes in service performance", in ACM CoNEXT, 2011, 12 pages.
Mahimkar, Ajay et al., "Robust Assessment of Changes in Cellular Networks", in ACM CoNEXT, 2013, 12 pages.
Mai, Haohui et al., "Debugging the Data Plane with Anteater", SIGCOMM Comput. Commun. Rev. 41, 4, Aug. 2011, 12 pages.
Naseer, Usama et al., "Configanator: A Data-driven Approach to Improving CDN Performance", in USENIX NSDI, Apr. 4-6, 2022, 25 pages.
Naseer, Usama et al., "Configtron: Tackling network diversity with heterogeneous configurations", in ACM HotCloud, 2017, 8 pages.
Peyre, Gabriel et al., "Computational Optimal Transport", Foundations and Trends® in Machine Learning 11, 5-6, 2019, 209 pages.
Prabhu, Santhosh et al., "Plankton: Scalable network configuration verification through model checking", in 17th USENIX Symposium on Networked Systems Design and Implementation (NSDI 20). USENIX Association, Santa Clara, CA, Feb. 25-27, 2020, 17 pages.
Prakash, Chaithan et al., "PGA: Using Graphs to Express and Automatically Reconcile Network Policies", in Proceedings of the 2015 ACM Conference on Special Interest Group on Data Communication (London, United Kingdom) (SIGCOMM '15). Association for Computing Machinery, New York, NY, USA, https://doi.org/10.1145/2785956.2787506, 2015, 14 pages.
Ramiro, Juan et al., "Self-Organizing Networks (SON): Self-Planning, Self-Optimization and Self-Healing for GSM, UMTS and LTE", Description of book downloaded Mar. 27, 24, 2011, 5 pages.
Roy, Swati et al., "Quantifying the Service Performance Impact of Self-Organizing Network Actions", in Proceedings of the 12th Conference on International Conference on Network and Service Management (CNSM 2016). International Federation for Information Processing, 2016, 9 pages.
Saha, Shambwaditya et al., "NetGen: Synthesizing Data-Plane Configurations for Network Policies", in Proceedings of the 1st ACM SIGCOMM Symposium on Software Defined Networking Research (Santa Clara, California) (SOSR '15). Association for Computing Machinery, New York, NY, USA, Article 17, https://doi.org/10.1145/2774993.2775006, 2015, 6 pages.
Schmelz, L. C. et al., "Self-Organisation in Wireless Networks—Use Cases and Their Interrelation", 2009, 5 pages.

Shen, Chong et al., "Framework for Self-Management of Hybrid Wireless Networks Using Autonomic Computing Principles", 3rd Annual Communication Networks and Services Research Conference, 2005, 7 pages.
Steffen, Samuel et al., "Probabilistic Verification of Network Configurations", in Proceedings of the Annual Conference of the ACM Special Interest Group on Data Communication on the Applications, Technologies, Architectures, and Protocols for Computer Communication (SIGCOMM '20). Association for Computing Machinery, https://doi.org/10.1145/3387514.3405900, 2020, 15 pages.
Sun, Xudong et al., "Testing Configuration Changes in Context to Prevent Production Failures", in 14th USENIX Symposium on Operating Systems Design and Implementation (OSDI 20). USENIX Association, https://www.usenix.org/conference/osdi20/presentation/sun, Nov. 4-6, 2020, 18 pages.
Sung, Yu-Wei E. et al., "Robotron: Top-down Network Management at Facebook Scale", in Proceedings of the 2016 ACM SIGCOMM Conference (Florianopolis, Brazil) (SIGCOMM '16). Association for Computing Machinery, New York, NY, USA, https://doi.org/10.1145/2934872.2934874, 2016, 14 pages.
Tang, Chunqiang et al., "Holistic Configuration Management at Facebook", in Proceedings of the 25th Symposium on Operating Systems Principles (Monterey, California) (SOSP '15). Association for Computing Machinery, New York, NY, USA, https://doi.org/10.1145/2815400.2815401, 2015, 16 pages.
Tian, Bingchuan et al., "Safely and Automatically Updating In-Network ACL Configurations with Intent Language", in Proceedings of the ACM Special Interest Group on Data Communication (Beijing, China) (SIGCOMM '19). Association for Computing Machinery, New York, NY, USA, https://doi.org/10.1145/3341302.3342088, 2019, 13 pages.
Vallender, SS , "Calculation of the Wasserstein distance between probability distributions on the line", Theory of Probability & Its Applications 18, 4 located at https://epubs.siam.org/doi/abs/10.1137/1118101?journalCode=tprbau, 1974.
Van Aken, Dana et al., "Automatic Database Management System Tuning Through Large-Scale Machine Learning", in Proceedings of the 2017 ACM International Conference on Management of Data (Chicago, Illinois, USA) (SIGMOD '17). Association for Computing Machinery, New York, NY, USA, https://doi.org/10.1145/3035918.3064029, 2017, 16 pages.
Vaswani, Ashish et al., "Attention is all you need", in Proceedings of the 31st International Conference on Neural Information Processing Systems (Long Beach, California, USA) (NIPS'17). Curran Associates Inc., Red Hook, NY, USA, 2017, 11 pages.
Wang, Shu et al., "Understanding and Auto-Adjusting Performance-Sensitive Configurations", SIGPLAN Not. 53, 2, https://doi.org/10.1145/3296957.3173206, Mar. 2018, 15 pages.
Xu, Xing et al., "Magus: Minimizing Cellular Service Disruption during Network Upgrades", in Proceedings of the 11th ACM Conference on Emerging Networking Experiments and Technologies (Heidelberg, Germany) (CoNEXT '15). Association for Computing Machinery, New York, NY, USA, https://doi.org/10.1145/2716281.2836106, 2015, 13 pages.
Zhang, Peng et al., "Differential Network Analysis", in 19th USENIX Symposium on Networked Systems Design and Implementation (NSDI 22). USENIX Association, Renton, WA, https://www.usenix.org/conference/nsdi22/presentation/zhang-peng, Apr. 4-6, 2022, 16 pages.
Zhang, Shenglin et al., "Rapid and Robust Impact Assessment of Software Changes in Large Internet-based Services", in ACM CoNEXT, 2015, 13 pages.
Zhao, Chenxingyu et al., "Dremel: Adaptive Configuration Tuning of RocksDB KV-Store", Proc. ACM Meas. Anal. Comput. Syst. 6, 2, Article 37, https://doi.org/10.1145/3530903, Jun. 2022, 30 pages.
Zhu, Hang et al., "Network Planning with Deep Reinforcement Learning", in Proceedings of the 2021 ACM SIGCOMM 2021 Conference (Virtual Event, USA) (SIGCOMM'21). Association for Computing Machinery, New York, NY, USA, https://doi.org/10.1145/3452296.3472902, 2021, 14 pages.

(56) References Cited

OTHER PUBLICATIONS

Zhu, Yuqing et al., "BestConfig: Tapping the Performance Potential of Systems via Automatic Configuration Tuning", (SoCC '17). Association for Computing Machinery, New York, NY, USA, https://doi.org/10.1145/3127479.3128605, 2017, 13 pages.

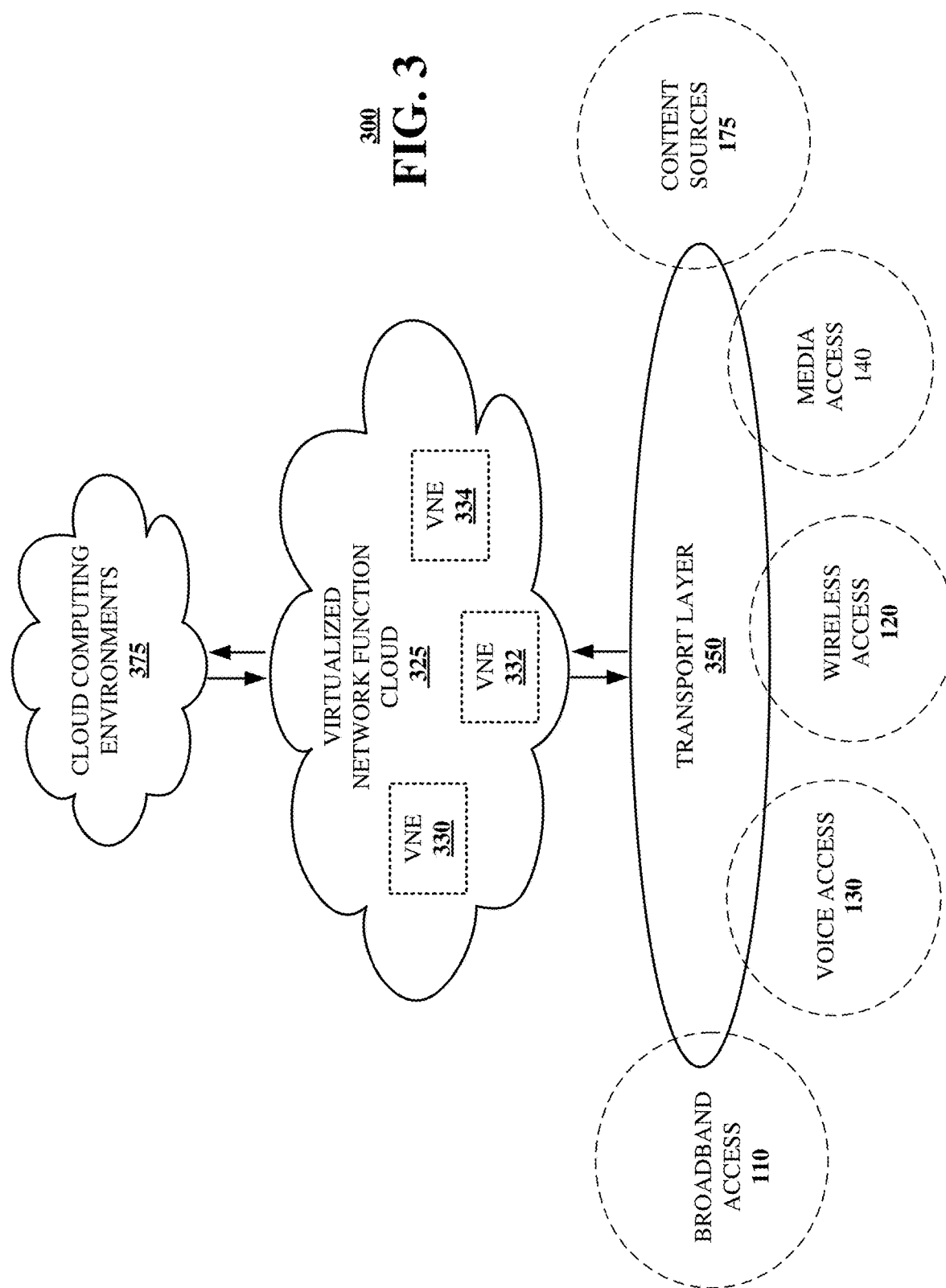

APPARATUSES AND METHODS FOR ENHANCING QUALITY OF SERVICE VIA AN EXPLORATION OF CONFIGURATION OPTIONS

FIELD OF THE DISCLOSURE

The subject disclosure relates to apparatuses and methods for enhancing quality of service via an exploration of configuration options.

BACKGROUND

As the world increasingly becomes connected via vast communication networks and systems and via various types of communication devices, additional opportunities are created/generated to provision communication services. The provisioning of communication services is accompanied by a host of challenges. Emerging applications such as autonomous vehicles, drones, augmented and virtual reality (AR/VR), Internet of Things (IoT), high-definition live audiovisual programming/content, online gaming, medical and surgical applications, and business transactions (e.g., stock/equities trading) impose enormous challenges on networks and systems to provide seamless connectivity and excellent quality of service (QoS) and quality of experience (QoE).

Configuration tuning and management plays a pivotal role across all aspects in enhancing QoS and QoE. For example, across generations of cellular networks (from 2G to 5G and beyond), the set of configuration parameters is expansive, and the tuning process is deemed as art by the operators and service providers leveraging domain knowledge and extensive experience. QoS and QoE can be measured using various metrics, such as coverage, data throughput (in downlink or uplink directions), voice call quality, admission failures, or call drops. Different configuration settings have the potential to have a different service performance impact. Further, the same configuration setting can have a contrasting service performance impact across diverse locations, potentially due to differences in environmental characteristics, network/system loads, etc.

In brief, there is a multitude of variables that may impact QoS and QoE. Furthermore, many of the variables tend to be dynamic in nature (such as, for example, in relation to user or device mobility), meaning that models supporting or representing QoS and QoE need to be able to adapt to changes in circumstances and conditions. In many instances, such as in relation to a rollout of a new or modified technology (e.g., a new or modified radio access technology), the interplay between pre-existing/legacy technology and the new/modified technology is not immediately known or fully understood. A lack of advanced or prior knowledge in respect of potential network/system configurations that may be utilized imposes tremendous risk on network/system operators and service providers.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for exploring a search-space or domain pertaining to values for configuration parameters and/or context attributes. Other embodiments are described in the subject disclosure.

One or more aspects of the subject disclosure include, in whole or in part, establishing a first cluster comprising a first plurality of members; identifying a first plurality of values to trial in respect of a first member of the first plurality of members, the first plurality of values being included in a second plurality of values and being less than an entirety of the second plurality of values; performing a first plurality of trials in respect of the first member of the first plurality of members based on iterating amongst the first plurality of values to obtain a first plurality of results; selecting at least one value included in the first plurality of values based on the first plurality of results; and utilizing the at least one value for each member of the first plurality of members of the first cluster.

One or more aspects of the subject disclosure include, in whole or in part, establishing a first cluster including a first plurality of members, the first cluster being used to facilitate a communication service as part of a communication network or system; subsequent to the establishing, determining that a value is assigned to a first member of the first plurality of members, the value corresponding to one of a configuration parameter or a context attribute; and based on the determining, assigning the value to at least a second member of the first plurality of members.

One or more aspects of the subject disclosure include, in whole or in part, establishing, by a processing system including a processor, a cluster including a plurality of members; determining, by the processing system, that values for configuration parameters for the cluster are unavailable; identifying, by the processing system and based on the determining, first values to trial for a configuration parameter of the configuration parameters, the first values being selected from a candidate set of values and being less than ten percent of the candidate set of values; performing, by the processing system, trials using the first values; monitoring, by the processing system, a performance for each trial of the trials; selecting, by the processing system and based on the monitoring, a value of the first values, resulting in a selected value; and assigning, by the processing system, the selected value to the configuration parameter for each member of the plurality of members.

Figure 1:
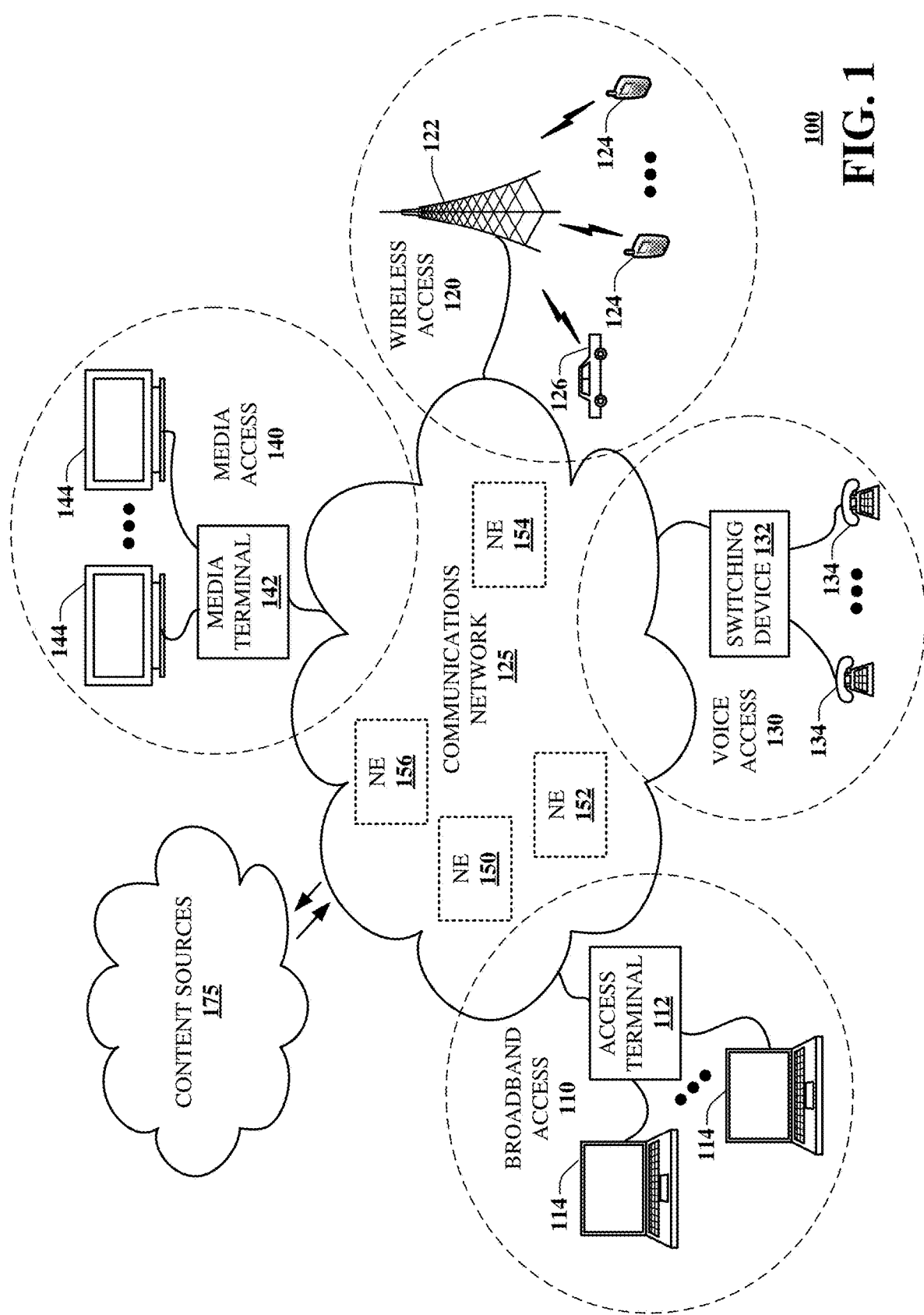
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, the system 100 can facilitate, in whole or in part, establishing a first cluster comprising a first plurality of members, identifying a first plurality of values to trial in respect of a first member of the first plurality of members, the first plurality of values being included in a second plurality of values and being less than an entirety of the second plurality of values, performing a first plurality of trials in respect of the first member of the first plurality of members based on iterating amongst the first plurality of values to obtain a first plurality of results, selecting at least one value included in the first plurality of values based on the first plurality of results, and utilizing the at least one value for each member of the first plurality of members of the first cluster. The system 100 can facilitate, in whole or in part, establishing a first cluster including a first plurality of members, the first cluster being used to facilitate a communication service as part of a communication network or system, subsequent to the establishing, determining that a value is assigned to a first member of the first plurality of members, the value corresponding to one of a configuration parameter or a context attribute, and based on the determining, assigning the value to at least a second member of the first plurality of members. The system 100 can facilitate, in whole or in part, establishing, by a processing system including a processor, a cluster including a plurality of members, determining, by the processing system, that values for configuration parameters for the cluster are unavailable, identifying, by the processing system and based on the determining, first values to trial for a configuration parameter of the configuration parameters, the first values being selected from a candidate set of values and being less than ten percent of the candidate set of values, performing, by the processing system, trials using the first values, monitoring, by the processing system, a performance for each trial of the trials, selecting, by the processing system and based on the monitoring, a value of the first values, resulting in a selected value, and assigning, by the processing system, the selected value to the configuration parameter for each member of the plurality of members.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

By way of introduction, aspects of this disclosure may facilitate an improvement/enhancement in radio access network (RAN) performance by tuning configurations, parameters, characteristics, or the like. In some embodiments, an analysis or examination of historical data may suggest that a potential new network/system configuration may yield an improvement in terms of quality of service (QoS) or quality of experience (QoE). Assuming that the new configuration yields an improvement (relative to some baseline or reference configuration), naturally the next question that arises may be whether even further improvements/enhancements may be obtained (such as, for example, by altering one or more parameters or characteristics of the new configuration). Conversely, if the new configuration yields a degradation (e.g., the new configuration is worse relative to a baseline configuration), it might be possible to revert back (e.g., revert back to the baseline configuration), but even then tremendous work/effort may be involved and may result in waste/inefficiencies. Accordingly, aspects of this disclosure provide an ability to identify/determine a never-trialed, new configuration for a network/system, while at the same time providing confidence (e.g., a high degree of probability relative to a threshold) that the new configuration will provide an improvement (relative to a baseline configuration).

Aspects of this disclosure may be used to effectively conduct configuration exploration activities in relation to one or more networks or systems, such as one or more cellular networks. Such activities may be guided by a set of principles, such as (1) nearby configuration values within a given context may result in a similar performance impact, and (2) nearby contexts with same, or similar, configuration settings may provide a similar performance or experience. With these principles in mind, once a particular value or context is "explored", trials of nearby values or contexts may be deferred and one can jump/traverse to far-away values or contexts (as potentially determined relative to one or more thresholds). Thus, an opportunity may be obtained to conduct a hierarchical exploration across clusters of configuration values and contexts.

As one skilled in the art will appreciate, there has been significant work and study in the fields of configuration synthesis, verification, and tuning. Configuration synthesis starts from a high-level intent specification and automatically generates low-level, node-specific configuration settings. Since networks/systems keep evolving, it may be important to verify and manage configurations over time. Configuration verification may facilitate a comparison of properties, such as reachability to expectations, with an ability to generate alarms or warnings in the event of a violation. Configuration tuning may involve the process of changing the configuration with a goal of enhancing (e.g., optimizing) a reward function such as service performance.

While configuration synthesis, verification, and tuning provide a general framework for designing, implementing, and maintaining a communication network or system, there are a multitude of challenges that are left unaddressed within that framework. For example, existing approaches leveraging reinforcement learning or supervised learning operate on a handful of configuration parameters; as such, the search space is tractable. In LTE and 5G cellular networks, for example, thousands of parameters with large ranges of values makes it difficult, if not impossible, to apply reinforcement learning (RL, or analogously contextual RL). Further, it is difficult to specify contexts (in contextual RL) that will result in performance enhancements/improvements, even with domain knowledge and experience having been gained or present. Moreover, give the large number of parameters and contexts involved, there is significant risk that a change or modification may actually result in a degradation in performance; this is even more difficult to characterize or assess in the view of time-based/dynamic changes or behaviors that may be present. In this regard, it is impractical or economically infeasible to engage in meaningful trials/experiments without incurring significant risk in respect of QoS or QoE.

Figure 2A:
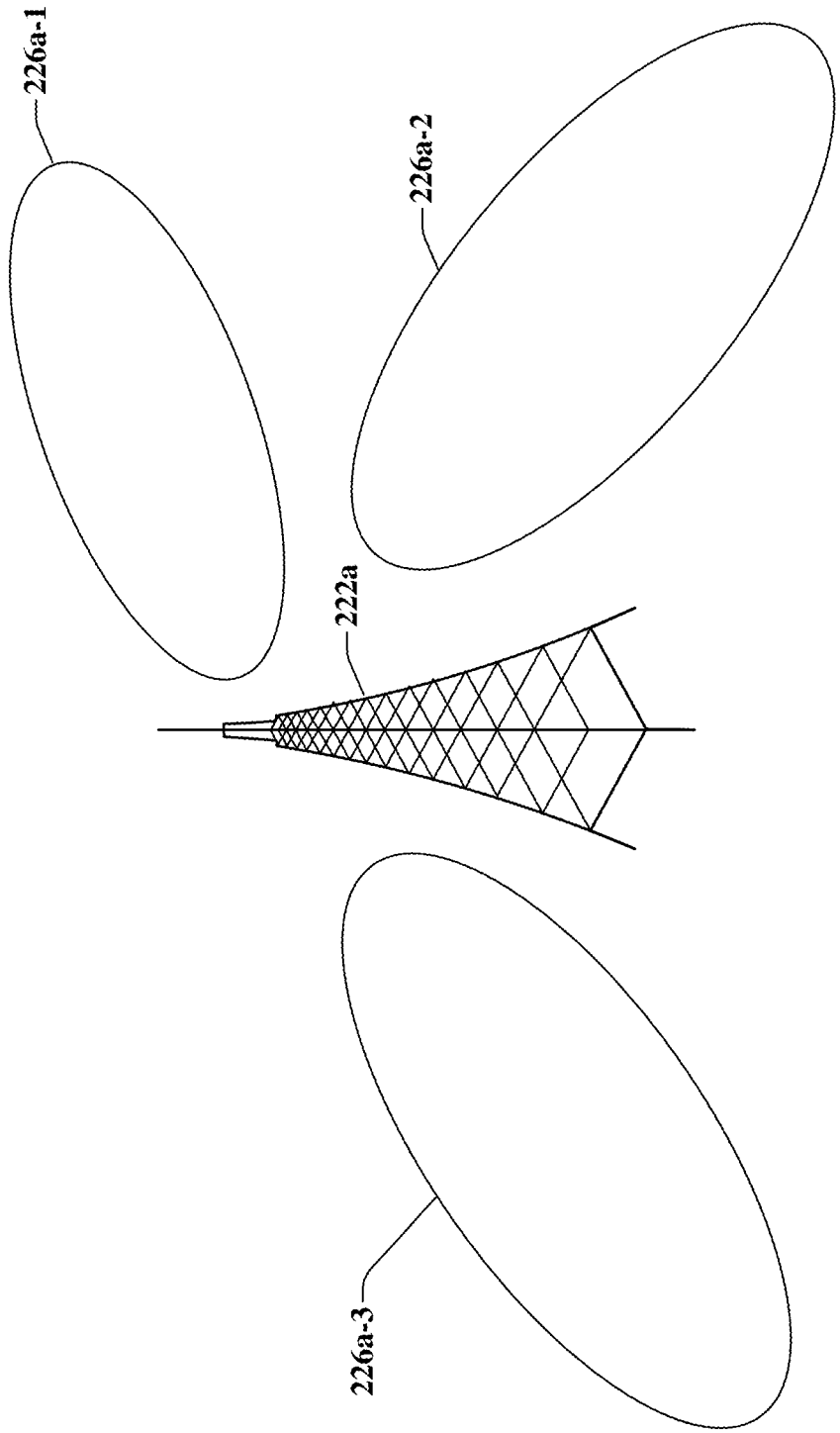
FIG. 2A is a block diagram illustrating an example, non-limiting embodiment of a system functioning within the communication network of FIG. 1 in accordance with various aspects described herein.

With the foregoing in mind, reference may now be made to FIG. 2A, which depicts a block diagram of an example, non-limiting embodiment of a system 200a in accordance with various aspects described herein. In some embodiments, one or more parts/portions of the system 200a may function within, or may be operatively overlaid upon, one or more parts/portions of the system 100 of FIG. 1. The system 200a may include network/system infrastructure, such as for example a tower, an access point, a base station, or the like, as fairly represented by reference character 222a. The infrastructure 222a may facilitate communication services in respect of one or more communication devices (see, e.g., mobile devices 124 of FIG. 1) via a use of one or more cells, such as a first cell 226a-1, a second cell 226a-2, and a third cell 226a-3. While three cells are shown in FIG. 2A, it is understood and appreciated that a different count of cells may be utilized or included in a given embodiment. Furthermore, while a single base station 222a is shown, it is appreciated that the system 200a may be arranged or organized in conjunction with one or more tracking area codes (TACs), that a plurality of TACs may be used in a given market, that a plurality of markets may form a cluster, and multiple clusters may be included within a given region. For purposes of this disclosure, it is understood and appreciated that a cell may correspond to the basic functional unit where configuration parameters are tuned. Further, a cell may be distinguished from other cells based on one or more parameters (e.g., operating frequency or frequency band).

Each of the cells (e.g., the cells 226a-1 through 226a-3) may be operative in accordance with a set of configuration parameters. For example, a set of parameters, P, may take the form: P={$P_1, P_2, \ldots P_n$}, providing 'n' parameters. Further, any given parameter (e.g., $P_n$) may assume a value from a set of 'm' unique values, e.g.: {$p_n^1, p_n^2, p_n^3, \ldots p_n^m$}. Thus, a specific configuration, $P_i$, may correspond to a unique combination of configuration parameter values (1 through m) for each of the parameters (1 through n). Examples of parameters that may be included or considered may include admission, handover, frequency/frequency band, transmission power, receiver sensitivity level, scheduling, use of multiple-input multiple-output (MIMO), noise, interference, modulation/demodulation, encryption/decryption, etc.

Each of the cells (e.g., the cells 226a-1 through 226a-3) may be described with a set of context attributes. For example, a set of context attributes, A, may take the form: A={$A_1, A_2, \ldots A_k$}, providing 'k' context attributes. Further, any given context attribute (e.g., $A_k$) may assume a value from a set of 'q' unique values, e.g.: {$a_k^1, a_k^2, a_k^3, \ldots a_k^q$}. Thus, a specific context attribute, $A_i$, may correspond to a unique combination of context attribute values (1 through q) for each of the context attributes (1 through k). In the context of a carrier, context attributes may include characteristics such as frequency, type, size, bandwidth, etc. Further, context attributes may be based on a surrounding environment, such as morphology.

A configuration distance, $D_{config}$, between two configurations (denoted as $P_i$ and $P_j$) may be defined as the difference between the two configurations, e.g.:

$$D_{config} = \|P_i - P_j\|_0$$

Similarly, a context attribute distance, $D_{context}$, between two contexts (denoted as $A_i$ and $A_j$) may be defined as the difference between the two contexts, e.g.:

$$D_{context} = \|A_i - A_j\|_0$$

The Wasserstein distance may be used to measure the difference between two distributions of a given characteristic (e.g., downlink throughput). Given two empirical measurements, x and y, denoted as x={$x_1, \ldots x_n$} and y={$y_1, \ldots y_m$}, the probability of each measurement may be denoted as $w_x$={$w_x^1, \ldots w_x^n$} and $w_y$={$w_y^1, \ldots w_y^m$}, respectively. Further, assuming that x conforms to a distribution $\zeta$ and y conforms to a distribution $\eta$, a computation/calculation of the Wasserstein distance between $\zeta$ and $\eta$ may correspond to solving an optimal transport problem in accordance with the following equation:

$$W(\zeta, \eta) = \min_t \sum_i^n \sum_j^m t_{i,j} d(x_i, y_j) = \min_T \text{trace}(T^\top D), \text{ subject to}$$

$$T1_n = w_x, T^\top 1_m = w_y,$$

where $1_n$ is an all-one vector of size n×1 and $d(x_i, y_j) = (x_i - y_j)^2$ is representative of the distance metric. As one skilled in the art will appreciate, the solving of the optimal transport problem may be done via linear programming.

Figure 2B:
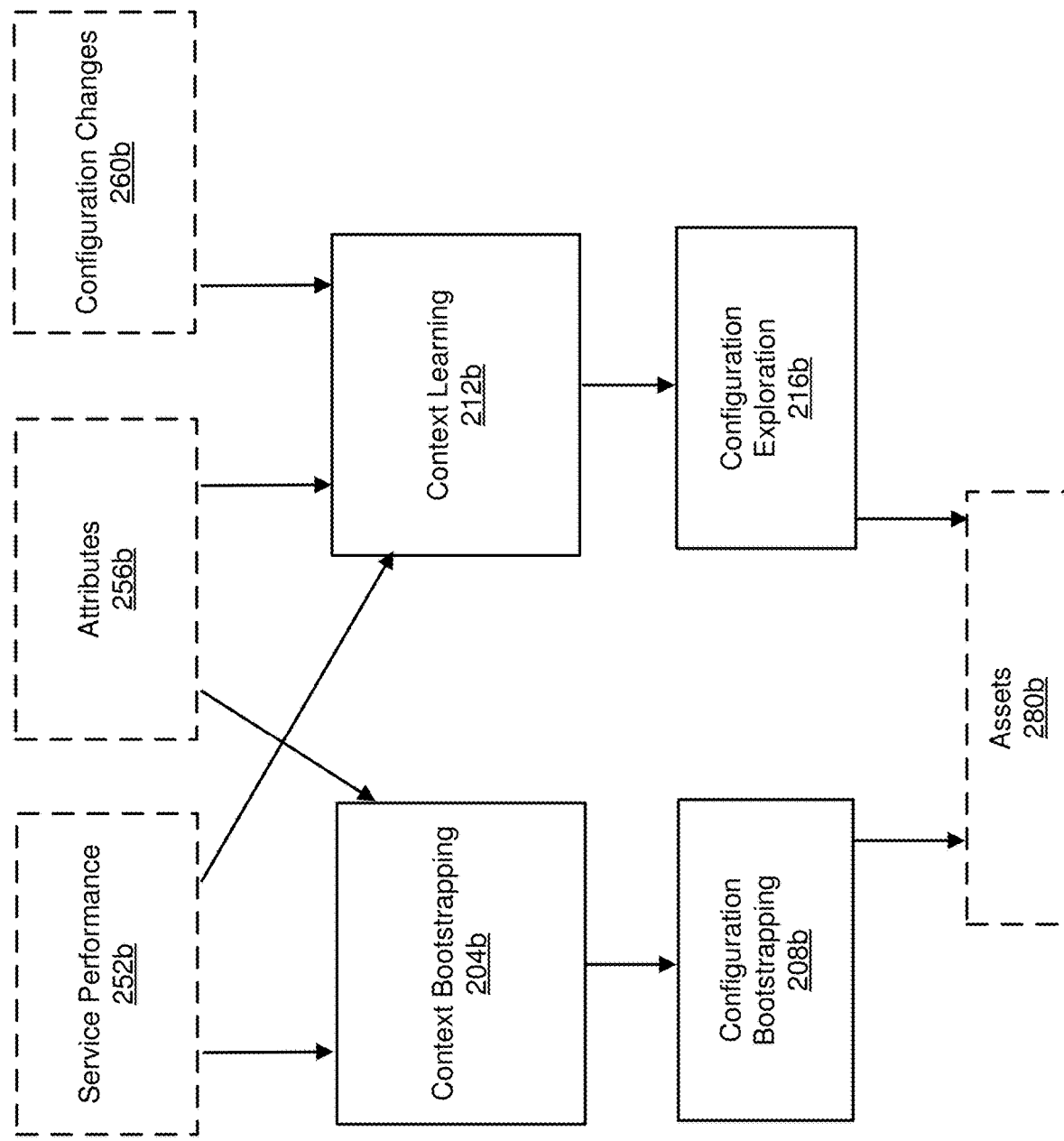
FIG. 2B is a block diagram illustrating an example, non-limiting embodiment of a system for exploring values for configuration parameters or context attributes in accordance with various aspects set forth herein.

With reference now to FIG. 2B, a block diagram of a system 200b in accordance with various aspects of this disclosure is shown. The system 200b may include a number of entities, denoted as context bootstrapping 204b, configuration bootstrapping 208b, context learning 212b, and configuration exploration 216b. The entities 204b, 208b, 212b, and 216b, may be implemented using hardware, software, firmware, or any combination thereof. The entities may be operative on a set of inputs, denoted as service performance 252b, attributes 256b, and configuration changes 260b. The inputs may be processed to generate outputs that may be applied in respect of one or more assets 280b, such as one or more base stations, towers, or the like.

The context bootstrapping 204b may use a relationship between service performance 252b and attributes 256b to determine where to conduct configuration parameter bootstrapping and exploration. The configuration bootstrapping 208b may determine or identify a value to first trial in a production network or system. The context learning 212b may continuously and adaptively learn the context (set of network/system attributes 256b) that shows performance improvement/enhancements achieved with configuration changes 260b. The configuration exploration 216b may determine what next configuration setting to trial or experiment with.

As set forth above, the context bootstrapping 204b may use a relationship between service performance 252b and attributes 256b to determine where to conduct configuration parameter bootstrapping and exploration. In this respect, it is appreciated that a service performance tradeoff may be captured using a composite quality index (CQI) to evaluate an impact tradeoff across a set of key performance indicators (KPIs). In various embodiments, a Chi-square test of independence between CQI and network/system attributes may be performed to determine/identify important attributes.

A Chi-square test statistic Xi,j may be computed for each attribute Xj and each performance metric $Y^{(i)}$ as:

$$Xi, j = \sum_{a=1}^R \sum_{b=1}^C (Oab - Eab)^2 / Eab,$$

where Oab corresponds to the observed count for the $a^{th}$ row (attribute value) and $b^{th}$ column (parameter value), Eab corresponds to the expected cell count in the $a^{th}$ row and $b^{th}$ column of the table, an R and C are the number of rows and columns, respectively.

A comparison may be performed in respect of the Chi-square test statistic Xi,j to a critical value from a chi-square distribution table with degrees of freedom df=(R−1)(C−1) and (a given) selected confidence value. If the Chi-square test statistic Xi,j is greater than the critical value, a null hypothesis that attribute Xj and performance metric $Y^{(i)}$ may be rejected. Thus, for each performance metric $Y^{(i)}$, a list of dependent attributes may be identified/determined.

A list of contexts that are eligible for conducting a configuration trial or experiment may be determined/identified via the context bootstrapping 204b. The configuration bootstrapping 208b may be used to determine/identify what configuration setting to trial. In some instances, it may be the case that the selection of the configuration setting may be based on domain knowledge or experience, simulation or emulation experiments, or even on a completely random basis. A determination or identification of a performance impact of the new configuration settings across multiple contexts may be obtained. In this respect, K nodes per context may be selected or used to enable a robust inference of performance impacts. It is noted that if K=1 (or some other appreciably small value), the performance impacts may be biased or incorrect.

The performance impact obtained via the configuration bootstrapping 208b may be determined using statistical measures and by comparing a study group (where a configuration change is being implemented) with a control group (where configuration change is not implemented). By comparing results from the study group and the control group, the effect or impact of external factors may be reduced (e.g., eliminated). Next, the performance impact may be quantified using a relative median difference in percentage as:

$$\delta = \frac{(x_{after} - x_{before})}{x_{before}} * 100\%,$$

where x can be the time series of any KPI or CQI, such that $x_{after}$ represents the median of the samples observed after the change and $x_{before}$ represents the median of the samples observed before or prior to the change. Empirical evidence suggests that a configuration change has a significant impact if the absolute value of $\delta$ is greater than 0.5%. Accordingly, an impact label Y may be assigned a value of: 'increase' if $\delta$ is greater than 0.5%, 'decrease' if $\delta$<−0.5%, and 'no impact' if the absolute value of $\delta$ is less than 0.5%.

The context learning 212b may facilitate a continuous process for each iteration of a configuration trial or setting in a network/system. The context learning 212b may learn important contexts where performance improvement is observed, which may facilitate a determination of where or when to next attempt the configuration trial or setting. Inputs to the context learning 212b may include service performance impacts (CQI and/or individual KPIs), configuration changes, and a list of network/system attributes.

To achieve robust learning of important contexts, a group of configurations G may be divided into subgroups Gs based on existing combinations of configuration changes and having the form:

$$Gs = \{c_i^{n \to m}, \ldots, c_j^{p \to q} : i \neq j, m \neq n, p \neq q\}.$$

For each subgroup Gs, a matrix of attributes As may be extracted in which each row is a vector of attributes of a cell with Gs applied, along with corresponding impact labels Ys. The dataset may then be augmented by including data from its conjugate, i.e., the subgroup with configuration changes of inverse direction as Gs'={$c_i^{m \to n}$, ..., $c_j^{q \to p}$}, whose attributes are kept as normal or maintained (e.g., As'=As), but the impact labels are inverted (e.g., in Gs' the impact labels are −Ys'). Further, to preclude a recommendation of unseen attributes, a batch of missing attribute data As* may be defined with 'inconclusive' labels Ys*. Each value of an attribute in As* may be picked from all possible values other than the values existing in As and As'. Since it may be a goal to determine the cells that would benefit from Gs being applied thereto (e.g., the label of 'increase' may be desired relative to 'decrease', 'no impact', and 'inconclusive'), the 'decrease', 'no impact', and 'inconclusive' classes may be merged as one. Thereafter, following such merger, the task may be restated or reformulated as one of binary classification. A classifier may be trained with attributes [As, As', As*] as input and impact labels [Ys, −Ys', Ys*] as output.

Given that the input data of the network/system attributes may be discrete values, and the embedding space learned by the classifier should be comprehensible for the sake of generating configuration recommendations, a straightforward approach is to use a decision tree classifier. However, to mitigate over-fitting to the training set (with bias on classes with more data samples, coupled with instability to noisy data), a rule learning algorithm may be used to construct a list of decisions by iteratively adding rules and then removing logic components that are already considered by those rules. For a given subgroup Gs, a rule-set may be selected depending on generating a higher classification accuracy on some or all test-sets. Then, branches in the decision tree or rule set that produce 'increase' in terms of class or label may be translated to logic clauses in disjunctive normal form (DNF), and may be denoted as $As^{Rule}$. $As^{Rule}$ may represent a context of attributes for which the group of configuration changes have resulted in a performance improvement. A cell may be considered as a candidate for applying subgroup Gs if the cell possess attributes that satisfy any of the inner-nested condition-combinations in $As^{Rule}$. Such candidate cells may be denoted as $S(As^{Rule})$.

The configuration exploration 216b may be used to scale-up the exploration across a large number of network attributes and configuration settings. As set forth above, aspects of this disclosure leverage (a) the dependencies of nearby configuration settings within a context, and (b) dependencies of same configuration settings across nearby contexts. Thus, when one is confronted with determining a next configuration value or context to trial, far-away values are expected to yield more insights with respect to performance impact than near-by/proximal values. As such, a hierarchical structure may be defined to determine the exploration. For example, if a given configuration parameter can assume a value between 0 and 100, two groups for the parameter may be defined as 0-50 and 51-100. Values may be iteratively trialed between the groups. Once a particular value (e.g., 75) is trialed, nearby/proximal values (e.g., 65-74 and 76-84) may be deferred or avoided. A similar methodology may be applied in respect of contexts. By using such an approach, the number of steps or iterations may be reduced (e.g., minimized) to realize enhanced (e.g., optimal) settings.

To provide a more concrete, yet simplified, example of aspects of this disclosure, it may be assumed that a communication network/system operator or service provider desires to extend its scope/reach to new, untapped markets. To demonstrate, it may be the case that it is desirable to provide communication services in a few urban areas or cities (e.g., Chicago, Los Angeles, etc.) and some rural areas (e.g., proximal to a group of farm fields in Iowa, near a sizable cattle ranch in Texas, etc.). In this simplistic example, geographical location may be representative of a context attribute, and further it may be assumed that: (1) the urban areas/cities are similar to one another in terms of context, (2) the rural areas are similar to one another in terms of context, and (3) the urban areas/cities are dissimilar to the rural areas in terms of context. In this regard, the urban areas/cities may form, or be treated as, a first cluster and the rural areas may form, or be treated as, a second cluster.

Furthermore, in this example it may be assumed that the configuration parameter space may include configuration parameters that may each assume one of ten thousand values, illustratively denoted as values 1 through 10,000. To trial each parameter value individually, with respect to each member of each cluster, might take too long (e.g., a trial involving each parameter value may take on the order of days to obtain results of sufficient quality and/or reliability). In this respect, and assuming a lack of trials within a given cluster, an iterative set of trials may be performed against selected ones of the parameter values (e.g., using parameter values 1, 11, 21, 31, 41, and so on, until reaching 9,991) for a given member (e.g., Chicago) of the given cluster (e.g., urban areas/cities). Once performance has been determined within the trials performed to that point, the performance may be ranked. At that point, the best or optimum parameter value may be selected from/within the ranking, or further trials (proximal to the selected parameter value) may be performed in an effort to zero-in on the optimum or best parameter value for the given member (e.g., Chicago). Thereafter, it might not be necessary to re-trial or explore the parameter values for other members (e.g., Los Angeles) of the cluster (e.g., urban areas/cities), as the trials performed against a first member (e.g., Chicago) of the cluster (e.g., urban areas/cities) may be extended to the other members of the cluster.

It is understood and appreciated that there may exist a dependency between two or more configuration parameters (or more generally, variables) of the configuration parameter space. In this respect, when conducting trials of the type set forth above, it may be necessary to iterate in respect of combinations of values for two or more of the configuration parameters/variables to provide for an accurate characterization. Furthermore, it is appreciated that in the foregoing, simplified example that geography served as a/the context attribute for forming/defining the clusters. However, as set forth above, the context attribute space may include a plurality of context attributes. In this regard, and perhaps somewhat counterintuitively, it is appreciated that a "medium" or "mid-size city" (e.g., Louisville, Kentucky) may, in some instances, actually be included as part of a cluster (e.g. the second cluster involving the rural areas described above) with other members (e.g., the farm fields in Iowa, the cattle ranch in Texas, etc.) that, at least on first blush, appear to be dissimilar from one another, due to sharing much in common with one another in terms of the context attributes.

In some of the examples set forth above, clusters were formed/defined using the context attributes, then trials were performed against the configuration parameters/configuration parameter space, and then values for the configuration parameters were applied/assigned to the members of the clusters based on the trials. In some embodiments, the roles between the context attributes and the configuration parameters may be reversed. For example, in some embodiments or instances it may be the case that clusters may be formed/defined using the configuration parameters, then trials may be performed against the context attributes/context attribute space, and then values for the context attributes may be applied/assigned to the members of the clusters. Still further, a blended approach may be used (e.g., a first set of clusters may be formed/defined using at least a subset of the context attributes, and a second set of clusters may be formed/defined using at least a subset of the configuration parameters) in some embodiments.

Figure 2C:
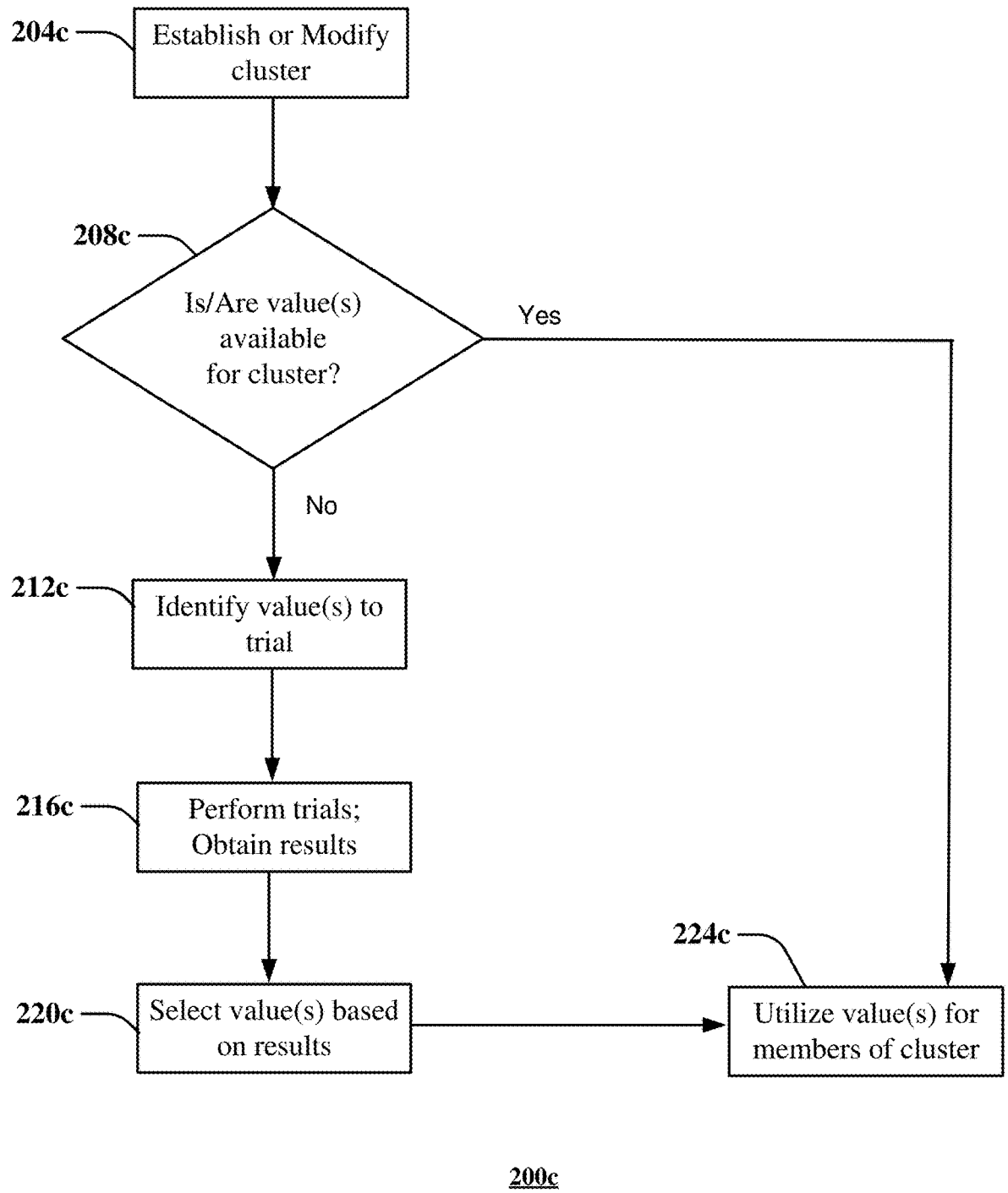
FIG. 2C depicts an illustrative embodiment of a method in accordance with various aspects described herein.

Referring now to FIG. 2C, an illustrative embodiment of a method 200c in accordance with various aspects described herein is shown. The method 200c may be implemented or executed, in whole or in part, in conjunction with one or more systems, devices, and/or components, such as for example the systems, devices, and components set forth herein. In some embodiments, the method 200c may be wholly or partially implemented or executed via one or more processing systems, where each such processing system may include one or more processors. Further, in some embodiments, operations of the method 200c may be embodied as instructions that may be executed by one or more processing systems to obtain/realize the functionality associated therewith. The instructions may be stored in one or more forms and/or in respect of one or more entities, such as a memory, a transitory or non-transitory computer or machine readable medium, etc. Various operations facilitated via the method 200c are described below in relation to the blocks shown in FIG. 2C.

In block 204c, one or more clusters may be established or modified. For example, it may be the case that, in a first instance, that there is a lack of clusters (such as, for example, in relation to a first execution of the method 200c), such that the clusters are established or initiated. In other cases, clusters may already exist or be present, and a member may be added to a cluster or removed from the cluster. As part of block 204c, one or more algorithms may be utilized to define criteria for admission of a member to, or removal of a member from, a cluster. The criteria may utilize or may be based on domain knowledge/expertise and/or a use of artificial intelligence or machine learning.

In block 208c, a determination may be made whether there are values that are available for members of the clusters. For example, in a first instance it may be the case that the values are lacking (or are stale), such that the determination of block 208c should be answered in the negative (and flow may proceed from block 208c to block 212c). Conversely, if other instances it may be the case that values are available and/or are current/valid (such that flow may proceed from block 208c to block 224c).

In block 212c, values may be identified to serve as a basis for trial. The particular values to use for trial may be selected based on domain knowledge/expertise and/or a use of artificial intelligence or machine learning. The selection of the values may be guided by one or more principles set forth above, such as (1) nearby configuration values within a given context may result in a similar performance impact, and (2) nearby contexts with same, or similar, configuration settings may provide a similar performance or experience. Tradeoffs may be made between robustness/quality in trials/testing on the one hand, and speed of obtaining results on the other hand, in terms of how many values to select for a given trial.

In block 216c, trials may be performed. For example, as part of block 216c, the trials may be performed based on the values identified/selected as part of block 212c. One or more results of the trials may be captured or stored. The results may be indicative of performance in accordance with one or more thresholds or metrics (e.g., key performance indicators).

In block 220c, one or more values may be selected from the trials/results of block 216c. For example, it may be the case that a value may be acceptable if the value exceeds a threshold (or, analogously, is less than a threshold). Comparison to a threshold may help to reduce the time spent in trial, as it may be sufficient to identify an acceptable value (as opposed to the "best" or "optimum" value). In some embodiments, the selection of a value as part of block 220c may seek to identify the best or optimum value amongst a set of (candidate) values. In this respect, block 220c may include ranking the set of values and selecting the best or the optimum value from amongst the ranked set.

In block 224c, the values may be utilized for members of the cluster. Block 224c may include an assignment of the values to one or more resources.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. One or more operations or functions may be based on one or more other operations or functions.

As demonstrated herein, the various aspects of this disclosure may be integrated as part of numerous practical applications involving a provisioning of communication services as part of one or more networks or systems. For example, aspects of this disclosure may be integrated as part of one or more networks or systems that may be operative in accordance with one or more radio access technologies (RATs). In some embodiments, aspects of this disclosure may be applied in connection with one or more cellular networks. In some embodiments, aspects of this disclosure may be applied in respect of resources of one or more data centers, data servers, and the like. Still further, aspects of this disclosure may be integrated as part of practical applications involving a positioning or vehicles or assets (e.g., control over autonomous or semi-autonomous vehicles), a performance of medical or surgical procedures, mineral or chemical extractions or manufacturing processes, manufacturing or robotics-based applications, etc. In brief, aspects of this disclosure may be particularly valuable where a domain or search-space is relatively large (involving hundreds, thousands, or even millions of parameters or attributes), with the practicalities of the situation or circumstances making exploration or testing of the entirety of the domain or search-space impractical (e.g., it may only be practical to explore or test 10% [or less] of a possible domain or search-space). Further, aspects of this disclosure enable a convergence onto a value (or a set of values) that may be utilized in a given practical application within relatively short time frames (e.g., time frames less than a threshold), without suffering from any appreciable loss in terms of quality or accuracy. In this respect, the various aspects of this disclosure represent substantial improvements relative to conventional techniques/technologies that are error prone and incur long lead times to implement. In short, and as demonstrated herein, the various aspects of this disclosure are not directed to abstract ideas. To the contrary, the various aspects of this disclosure are directed to, and encompass, significantly more than any abstract idea standing alone.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200a, system 200b and method 200c presented in FIGS. 1, 2A, 2B, and 2C. For example, the virtualized communication network 300 can facilitate, in whole or in part, establishing a first cluster comprising a first plurality of members, identifying a first plurality of values to trial in respect of a first member of the first plurality of members, the first plurality of values being included in a second plurality of values and being less than an entirety of the second plurality of values, performing a first plurality of trials in respect of the first member of the first plurality of members based on iterating amongst the first plurality of values to obtain a first plurality of results, selecting at least one value included in the first plurality of values based on the first plurality of results, and utilizing the at least one value for each member of the first plurality of members of the first cluster. The virtualized communication network 300 can facilitate, in whole or in part, establishing a first cluster including a first plurality of members, the first cluster being used to facilitate a communication service as part of a communication network or system, subsequent to the establishing, determining that a value is assigned to a first member of the first plurality of members, the value corresponding to one of a configuration parameter or a context attribute, and based on the determining, assigning the value to at least a second member of the first plurality of members. The virtualized communication network 300 can facilitate, in whole or in part, establishing, by a processing system including a processor, a cluster including a plurality of members, determining, by the processing system, that values for configuration parameters for the cluster are unavailable, identifying, by the processing system and based on the determining, first values to trial for a configuration parameter of the configuration parameters, the first values being selected from a candidate set of values and being less than ten percent of the candidate set of values, performing, by the processing system, trials using the first values, monitoring, by the processing system, a performance for each trial of the trials, selecting, by the processing system and based on the monitoring, a value of the first values, resulting in a selected value, and assigning, by the processing system, the selected value to the configuration parameter for each member of the plurality of members.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
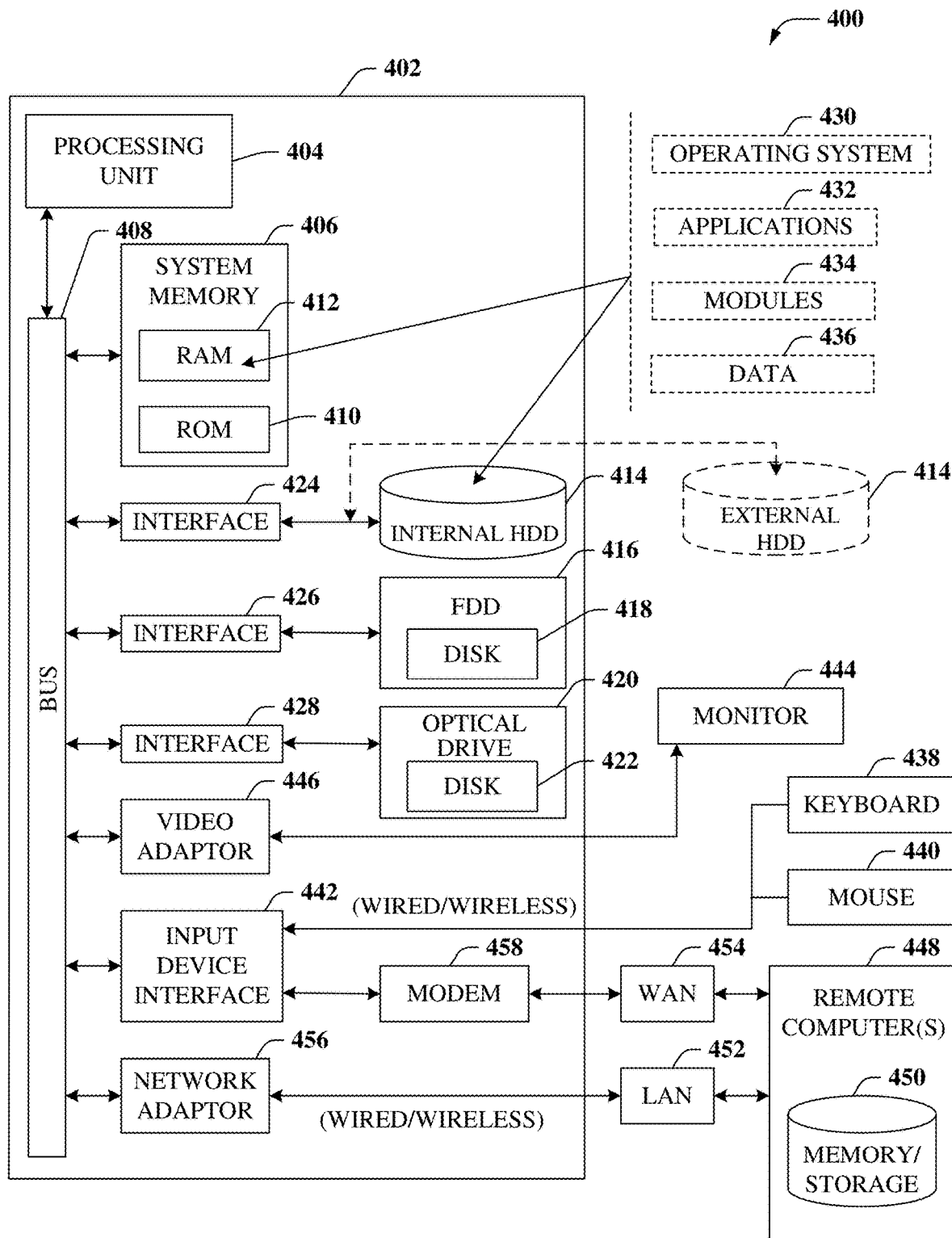
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 can facilitate, in whole or in part, establishing a first cluster comprising a first plurality of members, identifying a first plurality of values to trial in respect of a first member of the first plurality of members, the first plurality of values being included in a second plurality of values and being less than an entirety of the second plurality of values, performing a first plurality of trials in respect of the first member of the first plurality of members based on iterating amongst the first plurality of values to obtain a first plurality of results, selecting at least one value included in the first plurality of values based on the first plurality of results, and utilizing the at least one value for each member of the first plurality of members of the first cluster. The computing environment 400 can facilitate, in whole or in part, establishing a first cluster including a first plurality of members, the first cluster being used to facilitate a communication service as part of a communication network or system, subsequent to the establishing, determining that a value is assigned to a first member of the first plurality of members, the value corresponding to one of a configuration parameter or a context attribute, and based on the determining, assigning the value to at least a second member of the first plurality of members. The computing environment 400 can facilitate, in whole or in part, establishing, by a processing system including a processor, a cluster including a plurality of members, determining, by the processing system, that values for configuration parameters for the cluster are unavailable, identifying, by the processing system and based on the determining, first values to trial for a configuration parameter of the configuration parameters, the first values being selected from a candidate set of values and being less than ten percent of the candidate set of values, performing, by the processing system, trials using the first values, monitoring, by the processing system, a performance for each trial of the trials, selecting, by the processing system and based on the monitoring, a value of the first values, resulting in a selected value, and assigning, by the processing system, the selected value to the configuration parameter for each member of the plurality of members.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies.

Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
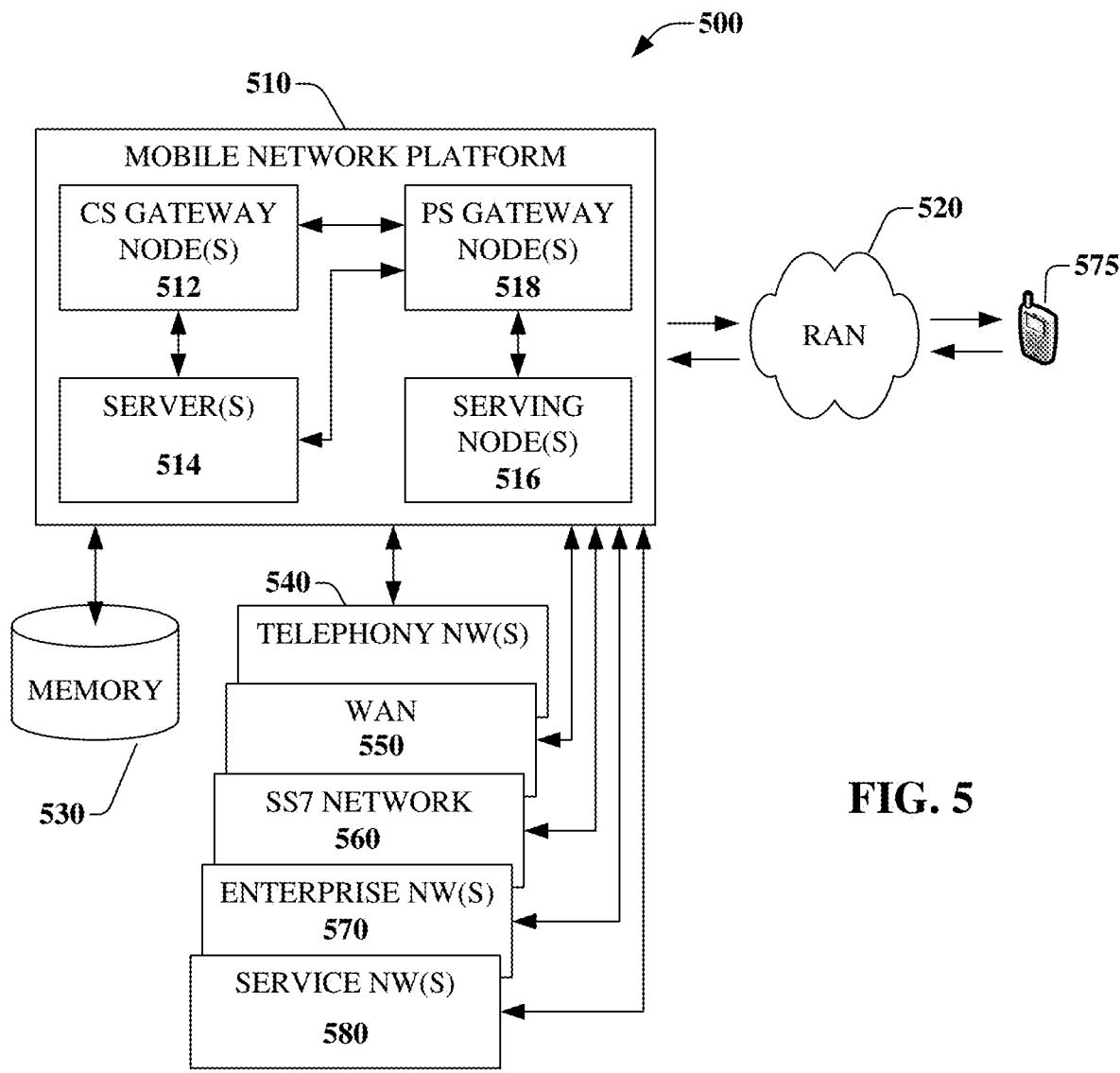
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the platform 510 can facilitate, in whole or in part, establishing a first cluster comprising a first plurality of members, identifying a first plurality of values to trial in respect of a first member of the first plurality of members, the first plurality of values being included in a second plurality of values and being less than an entirety of the second plurality of values, performing a first plurality of trials in respect of the first member of the first plurality of members based on iterating amongst the first plurality of values to obtain a first plurality of results, selecting at least one value included in the first plurality of values based on the first plurality of results, and utilizing the at least one value for each member of the first plurality of members of the first cluster. The platform 510 can facilitate, in whole or in part, establishing a first cluster including a first plurality of members, the first cluster being used to facilitate a communication service as part of a communication network or system, subsequent to the establishing, determining that a value is assigned to a first member of the first plurality of members, the value corresponding to one of a configuration parameter or a context attribute, and based on the determining, assigning the value to at least a second member of the first plurality of members. The platform 510 can facilitate, in whole or in part, establishing, by a processing system including a processor, a cluster including a plurality of members, determining, by the processing system, that values for configuration parameters for the cluster are unavailable, identifying, by the processing system and based on the determining, first values to trial for a configuration parameter of the configuration parameters, the first values being selected from a candidate set of values and being less than ten percent of the candidate set of values, performing, by the processing system, trials using the first values, monitoring, by the processing system, a performance for each trial of the trials, selecting, by the processing system and based on the monitoring, a value of the first values, resulting in a selected value, and assigning, by the processing system, the selected value to the configuration parameter for each member of the plurality of members.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
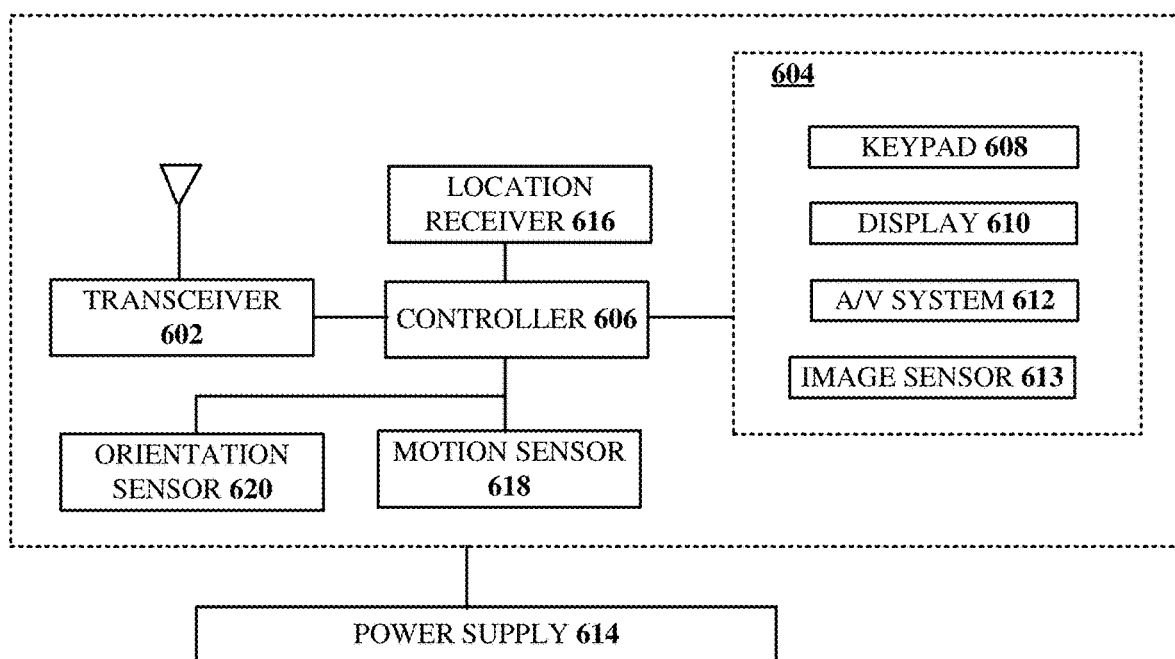
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the computing device 600 can facilitate, in whole or in part, establishing a first cluster comprising a first plurality of members, identifying a first plurality of values to trial in respect of a first member of the first plurality of members, the first plurality of values being included in a second plurality of values and being less than an entirety of the second plurality of values, performing a first plurality of trials in respect of the first member of the first plurality of members based on iterating amongst the first plurality of values to obtain a first plurality of results, selecting at least one value included in the first plurality of values based on the first plurality of results, and utilizing the at least one value for each member of the first plurality of members of the first cluster. The computing device 600 can facilitate, in whole or in part, establishing a first cluster including a first plurality of members, the first cluster being used to facilitate a communication service as part of a communication network or system, subsequent to the establishing, determining that a value is assigned to a first member of the first plurality of members, the value corresponding to one of a configuration parameter or a context attribute, and based on the determining, assigning the value to at least a second member of the first plurality of members. The computing device 600 can facilitate, in whole or in part, establishing, by a processing system including a processor, a cluster including a plurality of members, determining, by the processing system, that values for configuration parameters for the cluster are unavailable, identifying, by the processing system and based on the determining, first values to trial for a configuration parameter of the configuration parameters, the first values being selected from a candidate set of values and being less than ten percent of the candidate set of values, performing, by the processing system, trials using the first values, monitoring, by the processing system, a performance for each trial of the trials, selecting, by the processing system and based on the monitoring, a value of the first values, resulting in a selected value, and assigning, by the processing system, the selected value to the configuration parameter for each member of the plurality of members.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
    establishing a first cluster comprising a first plurality of members;
    identifying a first plurality of values to trial in respect of a first member of the first plurality of members, the first plurality of values being included in a second plurality of values and being less than an entirety of the second plurality of values;
    performing a first plurality of trials in respect of the first member of the first plurality of members based on iterating amongst the first plurality of values to obtain a first plurality of results;
    selecting at least one value included in the first plurality of values based on the first plurality of results; and
    utilizing the at least one value for each member of the first plurality of members of the first cluster.

2. The device of claim 1, wherein the operations further comprise:
subsequent to the utilizing, adding a member to the first cluster, resulting in an added member; and
utilizing, based on the adding, the at least one value for the added member.

3. The device of claim 1, wherein the operations further comprise:
establishing a second cluster comprising a second plurality of members, wherein the second plurality of members is at least partially different from the first plurality of members;
identifying a third plurality of values to trial in respect of a first member of the second plurality of members, wherein the third plurality of values is at least partially different from the first plurality of values;
performing a second plurality of trials in respect of the first member of the second plurality of members based on iterating amongst the third plurality of values to obtain a second plurality of results;
selecting a value included in the second plurality of values based on the second plurality of results; and
utilizing the value for each member of the second plurality of members of the second cluster.

4. The device of claim 3, wherein the third plurality of values is included in the second plurality of values and is less than the entirety of the second plurality of values.

5. The device of claim 1, wherein the establishing of the first cluster is based on an analysis of context attributes of the first plurality of members and a second plurality of members, wherein the second plurality of members is included as part of a second cluster that is different from the first cluster.

6. The device of claim 5, wherein the first plurality of values corresponds to values for configuration parameters pertaining to a communication network or system.

7. The device of claim 6, wherein the configuration parameters pertain to: admission, handover, frequency band, transmission power, receiver sensitivity level, scheduling, use of multiple-input multiple-output (MIMO), noise, interference, modulation/demodulation, encryption/decryption, or any combination thereof.

8. The device of claim 5, wherein the analysis is facilitated via an execution of at least one algorithm that is operative in accordance with machine learning, artificial intelligence, or a combination thereof.

9. The device of claim 1, wherein the establishing of the first cluster is based on an analysis of configuration parameters of the first plurality of members and a second plurality of members, wherein the second plurality of members is included as part of a second cluster that is different from the first cluster.

10. The device of claim 9, wherein the first plurality of values corresponds to values for context attributes pertaining to a communication network or system.

11. The device of claim 9, wherein the analysis is facilitated via an execution of at least one algorithm that is operative in accordance with machine learning, artificial intelligence, or a combination thereof.

12. The device of claim 1, wherein the first plurality of values pertains to a first variable and a third plurality of values pertains to a second variable, and wherein the iterating amongst the first plurality of values comprises iterating amongst combinations of the first plurality of values and the third plurality of values.

13. The device of claim 12, wherein the iterating amongst the combinations of the first plurality of values and the third plurality of values is based on identifying a dependency involving the first variable and the second variable.

14. A non-transitory machine-readable medium, comprising executable instructions that, when executed by a processing system including a processor, facilitate performance of operations, the operations comprising:
establishing a first cluster including a first plurality of members, the first cluster being used to facilitate a communication service as part of a communication network or system;
subsequent to the establishing, determining that a value is assigned to a first member of the first plurality of members, the value corresponding to one of a configuration parameter or a context attribute; and
based on the determining, assigning the value to at least a second member of the first plurality of members.

15. The non-transitory machine-readable medium of claim 14, wherein the communication service includes a cellular communication service.

16. The non-transitory machine-readable medium of claim 14, wherein the communication service includes a transmission of data involving resources of a data center.

17. The non-transitory machine-readable medium of claim 14, wherein when the value corresponds to the configuration parameter the value includes an identification of a frequency band, and wherein when the value corresponds to the context attribute the value includes an identification of whether an area where the communication service is provided is urban or rural.

18. A method, comprising:
establishing, by a processing system including a processor, a cluster including a plurality of members;
determining, by the processing system, that values for configuration parameters for the cluster are unavailable;
identifying, by the processing system and based on the determining, first values to trial for a configuration parameter of the configuration parameters, the first values being selected from a candidate set of values and being less than ten percent of the candidate set of values;
performing, by the processing system, trials using the first values;
monitoring, by the processing system, a performance for each trial of the trials;
selecting, by the processing system and based on the monitoring, a value of the first values, resulting in a selected value; and
assigning, by the processing system, the selected value to the configuration parameter for each member of the plurality of members.

19. The method of claim 18, further comprising:
ranking, by the processing system, the performance for each trial of the trials,
wherein the selecting is based on the ranking.

20. The method of claim 18, further comprising:
determining, by the processing system, that the value of the first values satisfies a threshold,
wherein the selecting is based on the determining that the value of the first values satisfies the threshold.

* * * * *